United States Patent
Bryce et al.

(10) Patent No.: US 10,218,532 B2
(45) Date of Patent: Feb. 26, 2019

(54) DETERMINATION OF A STATE OF OPERATION OF A DOMESTIC APPLIANCE

(71) Applicant: BRITISH GAS TRADING LIMITED, Windsor, Berkshire (GB)

(72) Inventors: Richard John Bryce, Windsor (GB); James Eric Anning, Windsor (GB)

(73) Assignee: British Gas Trading Limited, Windsor, Berkshire (GB)

( * ) Notice: Subject to any disclaimer, the term of this patent is extended or adjusted under 35 U.S.C. 154(b) by 4 days.

(21) Appl. No.: 15/125,102

(22) PCT Filed: Mar. 11, 2015

(86) PCT No.: PCT/GB2015/050715
§ 371 (c)(1),
(2) Date: Sep. 9, 2016

(87) PCT Pub. No.: WO2015/136285
PCT Pub. Date: Sep. 17, 2015

(65) Prior Publication Data
US 2017/0078111 A1    Mar. 16, 2017

(30) Foreign Application Priority Data
Mar. 11, 2014 (GB) .................................. 1404312.9
Mar. 11, 2014 (GB) .................................. 1404313.7

(51) Int. Cl.
*G06Q 10/00* (2012.01)
*H04L 12/28* (2006.01)
*H04L 12/26* (2006.01)

(52) U.S. Cl.
CPC ......... *H04L 12/2825* (2013.01); *G06Q 10/20* (2013.01); *H04L 12/2818* (2013.01); *H04L 43/0817* (2013.01); *H04L 2012/285* (2013.01)

(58) Field of Classification Search
CPC . G06Q 10/20; H04L 12/2818; H04L 12/2825; H04L 43/0817; H04L 2012/285
See application file for complete search history.

(56) References Cited

U.S. PATENT DOCUMENTS 5,893,047 A * 4/1999 Gimblett ............ G05B 19/0428
700/130
2002/0029575 A1    3/2002 Okamoto
(Continued)

FOREIGN PATENT DOCUMENTS

| EP | 1316132 A1 | 6/2003 |
| EP | 1875400 A2 | 1/2008 |

(Continued)

OTHER PUBLICATIONS

Search Report for corresponding application GB1404313.7 dated Jan. 22, 2015.
(Continued)

*Primary Examiner* — Bryan Bui

(57) ABSTRACT

Determination of a state of operation of a domestic appliance In one embodiment it is provided a method for determining a state of operation of a domestic appliance (2) in a plurality of domestic appliances (2), having: receiving (S10), from the domestic appliance (2), a time series (51, 52, 53, 54) of data (5) relating to the operation of the domestic appliance (2) over a cycle (4, 7) of operation; and determining (S20) the state of operation of the domestic appliance (2) based on comparing the received time series (51, 52, 53, 54) with a model of time series (151, 152, 153, 154; 251, 252, 253, 254, 255; 351, 352, 353, 354, 355) of data (50) corresponding to the operation of the plurality of domestic appliances (2) over a cycle (4, 7) of operation.

20 Claims, 10 Drawing Sheets

(56) References Cited

U.S. PATENT DOCUMENTS

| | | |
|---|---|---|
| 2002/0095269 A1 | 7/2002 | Natalini et al. |
| 2011/0125432 A1 | 5/2011 | Pomerantz et al. |
| 2012/0192003 A1 | 7/2012 | Akiyama et al. |
| 2012/0235813 A1 | 9/2012 | Huang et al. |

FOREIGN PATENT DOCUMENTS

| | | |
|---|---|---|
| EP | 2264680 A1 | 12/2010 |
| EP | 2533467 A1 | 12/2012 |
| EP | 2677687 A2 | 12/2013 |
| GB | 2502062 A | 11/2013 |
| WO | 2006114134 A1 | 11/2006 |

OTHER PUBLICATIONS

Examination Report for corresponding Singapore Application No. 11201607506X, dated Jun. 27, 2018.

\* cited by examiner

DETERMINATION OF A STATE OF OPERATION OF A DOMESTIC APPLIANCE

RELATED APPLICATIONS

This application is a U.S. National Stage Entry of PCT/GB2015/050715, entitled "Determination of a State of Operation of a Domestic Appliance," filed Mar. 11, 2015, which claims the benefit of the filings of Great Britain Application Nos. 1404313.7 and 1404312.9, all of which are incorporated herein by reference for all purposes.

TECHNICAL FIELD

This invention relates, but is not limited, to a method, a device, a computer program product and apparatus for determining a state of operation of one or more appliances, such as domestic appliances.

BACKGROUND

It is known to monitor remotely the operation of one or more heating systems, such as boilers. In some known examples, a device monitoring the operation of the heating systems triggers alerts in response to fault codes, or crossing of a threshold of a given parameter. In other known examples, the monitoring device reacts to a rate of change of different parameters.

However in the known examples the trigger of the alerts is instantaneous for each monitored parameter. Therefore in the known examples each parameter is taken simply independently, and in-depth analysis of the operation of the heating system or of the cause for the fault is difficult.

Furthermore in the known examples the trigger of the alerts only depends on the level set for the triggering threshold or the triggering rate of change of the parameter. Therefore, even if the operation of the heating system slowly but surely tends to a fault, it is difficult in the known example to plan a pre-emptive maintenance until the triggering threshold or rate of change is reached. Simply lowering the level of the triggering threshold or triggering rate of change does not solve the problem, as it might generate false alarms and thus unnecessary and costly maintenance.

BRIEF DESCRIPTION OF THE DRAWINGS

Embodiments of the present invention will now be described, by way of example, with reference to the accompanying drawings, in which.

DESCRIPTION OF EXAMPLE EMBODIMENTS

Figure 1:
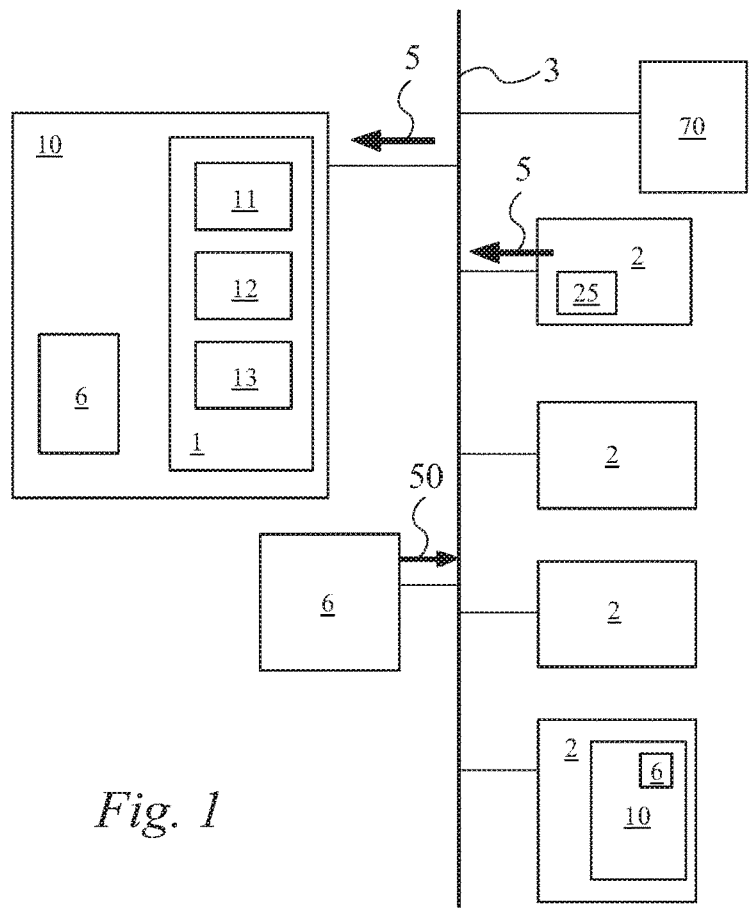
FIG. 1 schematically illustrates a plurality of appliances connected to an example device according to the disclosure, via a communications network.

With reference to the drawings in general, it will be appreciated that similar features or elements bear identical reference signs. It will also be appreciated that the Figures are not to scale and that for example relative dimensions may have been altered in the interest of clarity in the drawings. Also any functional block diagrams are intended simply to show the functionality that exists within the appliance (such as a washing machine and/or a heating system as non-limiting examples) and/or the network and/or the appliance, and should not be taken to imply that each block shown in the functional block diagram is necessarily a discrete or separate entity. The functionality provided by a block may be discrete or may be dispersed throughout the device and/or the appliance and/or network, or throughout a part of the device and/or the appliance and/or network. In addition, the functionality may incorporate, where appropriate, hard-wired elements, software elements or firmware elements or any combination of these.

The disclosure relates to the determination of the state of operation of an appliance, such as a domestic appliance, such as a washing machine and/or a fluid heating system, such as a boiler. The determined state may comprise the general condition of the appliance (such as normal wear of the appliance and/or of one of its components) and/or may be for example a normal mode of operation or a faulty mode of operation, such as a heating operation with a blocked condensate drain and/or a heating operation with a blocked flue intake. The appliance may be part of a plurality of domestic appliances connected to a server via a communications network. The server may receive data from one or more sensors and/or one or more components of, or associated to, one of the domestic appliances, the data relating to a cycle of operation. The determination of the state of operation of the domestic appliance may be based on the comparison, for example using pattern matching, of the received data with one or more models of data. The one or more models of data may correspond to different conditions of operation of the plurality of domestic appliances. The model may be assembled from data received from the plurality of domestic appliances or from predefined historic model data.

In the disclosure, a device may monitor the operation of one or more appliances and/or monitor the operation of one or more components of the appliances, over at least a cycle of operation. Thus in the disclosure the trigger of the alerts is not instantaneous for each monitored parameter, contrary to what often happens in the prior art. Therefore in the disclosure, several parameters may be taken independently or together over a cycle of operation, e.g. over a full cycle of operation of the appliance, and in-depth analysis of the operation of the appliance or of the cause for the fault may be facilitated.

Furthermore in the disclosure the monitoring may be performed over more than one cycle. Therefore if it is detected that the operation of the appliance slowly but surely tends to a fault, planning of a timely pre-emptive maintenance (such as repair and/or replacement of the appliance and/or one of its components) may be facilitated.

The example illustrated in FIG. 1 shows that a device 10 configured to implement the method of the disclosure may comprise at least a processor 11, a memory 12 and a controller 13.

In the example shown in FIG. 1, the device 10 may be configured to determine the state of operation of one or more appliances 2 remotely. The one or more appliances 2 may thus be connected to the device 10 by a communications network 3, and the device 10 may be configured to receive data 5 from the one or more appliances 2 over the network 3.

In order to receive the data 5 from the one or more appliances 2 over the network 3, the device 10 may comprise a communications server 1 connected to the network 3. Alternatively or additionally, as shown in FIG. 1, the device 10 may be configured to determine the state of operation of one or more appliances 2 at least partly locally, and the device 10 may thus be at least partly located in one or more of the appliances 2.

It is appreciated that the appliance may be any type of appliance, such as a domestic appliance (for example a washing machine or a fluid heating system as non-limiting examples).

The present specification will now be mainly directed to an appliance comprising a domestic fluid heating system which may be any type of domestic fluid heating appliance, which may for example be coupled to a fluid circulation circuit adapted to circulate heated fluid through a heating system of a building and/or to circulate heated fluid directly and/or directly in a domestic space. The heated fluid may be a liquid or gas, such as water or air as non-limiting examples. The domestic fluid heating system 2 may thus define a domestic space and water heating system. As already stated it is however appreciated that the present specification applies to any type of appliance, such as a domestic appliance.

Figure 3:
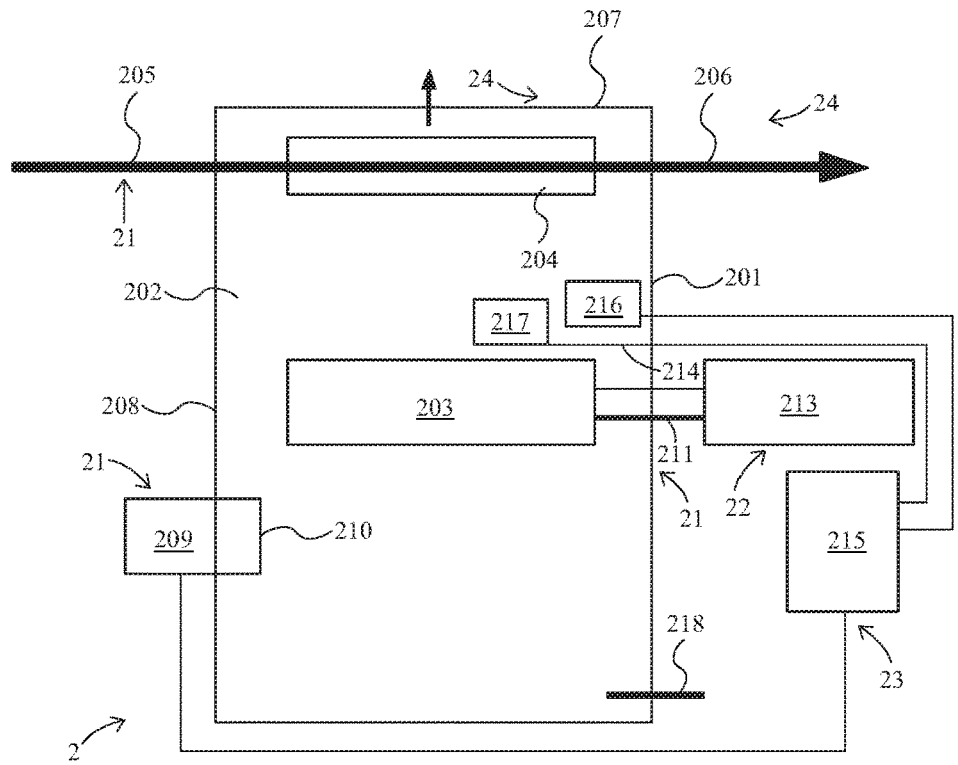
FIG. 3 schematically illustrates an example boiler comprising one or more components.

As illustrated in FIG. 3, the disclosure advantageously relates, but is not limited, to a domestic boiler 2.

Referring to FIG. 3, as a non-limiting example, the boiler 2 may conventionally comprise a housing 202 forming a combustion chamber incorporating a burner 203 and a heat exchanger 204 having an inlet 205 and an outlet 206 for water to be heated in the heat exchanger 204. The outlet 206 may be coupled to a fluid circulation circuit adapted to circulate heated fluid through a heating system of a building. The housing 202 comprises an exhaust outlet 207 for the exhaustion of flue gases produced by the burner 203 when heating water is flowing through the heat exchanger 204. The housing 202 also comprises a condensate drain 218 which allows the condensed water vapour produced during combustion to drain away.

Secured to one side 208 of the housing 202 is a fan 209, driven by a motor, which supplies air to the housing 202 through an inlet port 210 in the side 208 of the housing 202. The burner 203 has an inlet 211 through which gas for combustion reaches the burner 203. The gas is supplied from a constant pressure source and reaches the inlet 211 by way of a valve controlled by a control unit 213. A pilot gas burner 214 extends from the unit 213 for igniting the gas burner 203.

The unit 213 is itself controlled by a control unit 215, configured to set a power output of the boiler 2. The unit 215 supplies power to an H.T. generator 216 for generating high voltage sparks to ignite the pilot burner 214. Furthermore the unit 215 is responsive to signals from a flame failure device 217 which senses the presence of the flame of the pilot 214 and the flame of the main burner 203. The unit 215 may also receive data from, and send control signals to, the fan 209.

Figure 4:
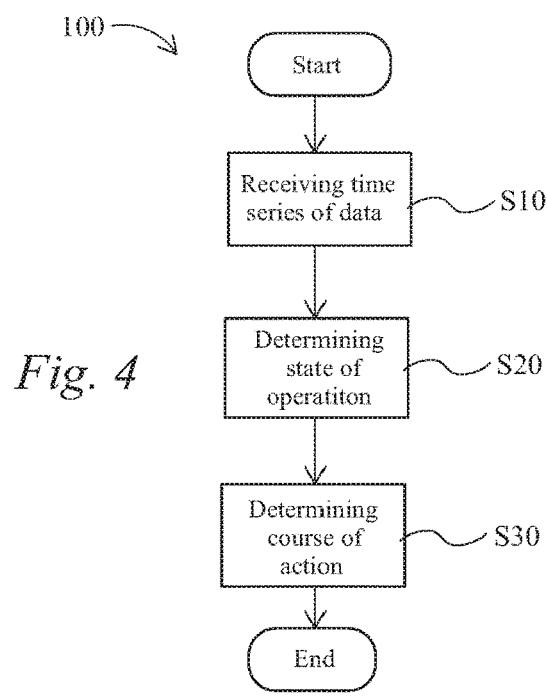
FIG. 4 shows a flow chart illustrating an example method for determining a state of operation of a heating system according to the disclosure.
Figure 5:
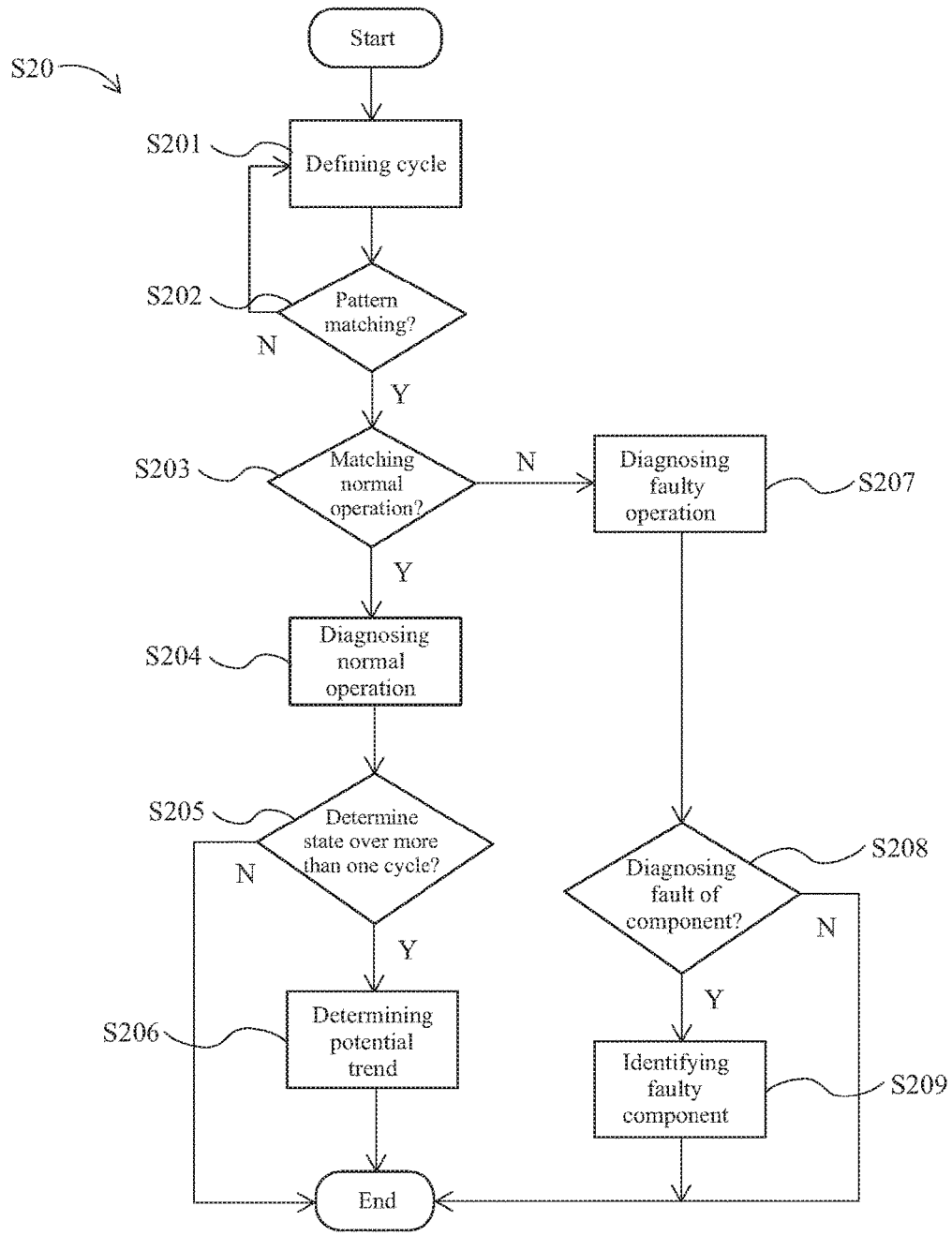
FIG. 5 shows a flow chart illustrating an example detail of a method for determining a state of operation of a heating system according to the disclosure.
Figure 6:
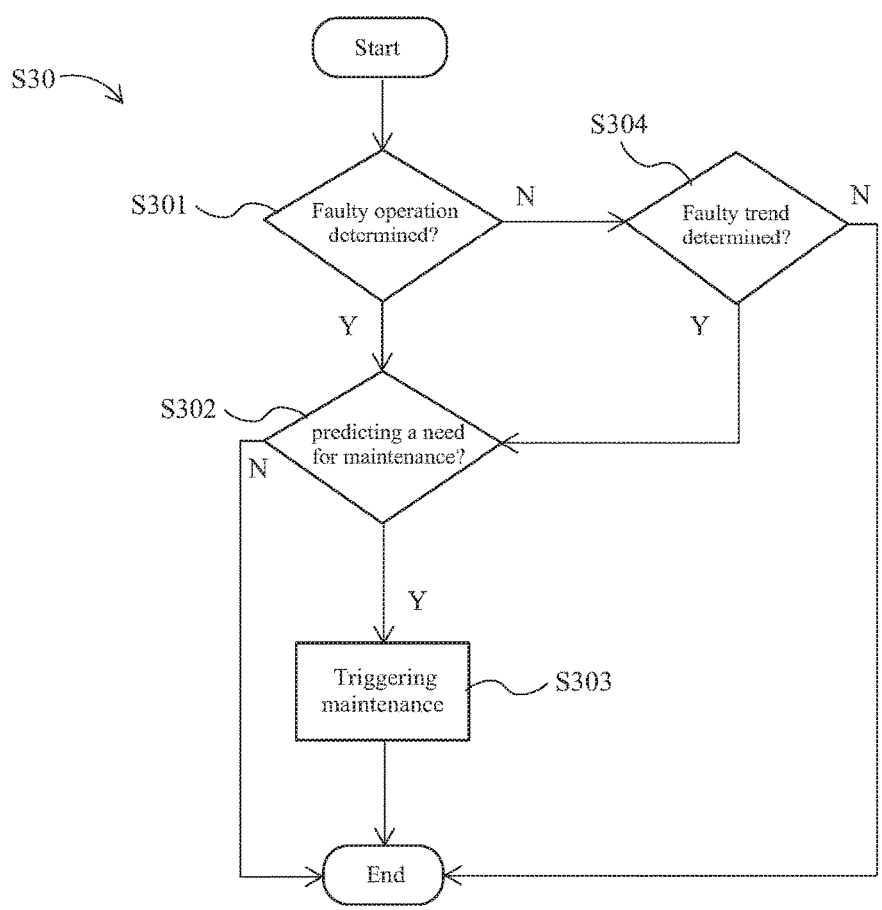
FIG. 6 shows a flow chart illustrating another example detail of a method for determining a state of operation of a heating system according to the disclosure.

FIG. 1 schematically shows an exemplary device 10 configured to implement a method 100 for determining a state of operation of an appliance, such as a domestic fluid heating system 2, in a plurality of appliances, such as domestic fluid heating systems 2, as schematically illustrated in FIGS. 4 to 6.

With reference to FIG. 4 and in a non-limiting example of a domestic fluid heating system 2, the method 100 mainly comprises:

receiving, at S10, from one of the domestic fluid heating systems 2, a time series of data 5 relating to the operation of the heating system 2 over a cycle 4 of operation; and determining, at S20, the state of operation of the heating system 2 which sent the time series of data 5, based on comparing the received time series of data 5 with a model of time series of data 50 corresponding to the operation of the heating system 2 over a cycle 4 of operation.

As explained if further detail below, the model of time series of data 50 may correspond to the operation of the plurality of domestic fluid heating systems 2 over a cycle of operation.

Data may also be received from the plurality of domestic fluid heating systems 2, e.g. for assembling the models and/or for statistics purposes, for example for better understanding and/or management of the network of systems 2 by an operator of the network of systems 2.

In some examples and as described in greater detail further below, the method 100 also comprises determining, at S30, a course of action based on the determining at S20. The course of action may comprise:

diagnosing a normal or a faulty operation of the heating system 2, predicting a need for maintenance based on the diagnosing (for example on detecting wear of one of the components of the system), and/or triggering maintenance of the heating system 2 based on the predicting.

The disclosure may thus enable the operator of the network of systems 2 to have a better understanding of the operation of the systems and/or to better manage the network.

As described in further detail below, in some examples the diagnosing may further comprise:

processing the complex and detailed time series of data 5, and displaying the processed time series of data 5 to a user in a way, for example which can be quickly and/or easily understood and/or navigated.

In the example illustrated in FIG. 1, the processed time series of data 5 may be displayed in an interface which may be displayed on a display screen of a device 70, to be used by a user of the processed time series of data 5. In some examples, the device 70 may be a desktop computer, a laptop computer, a mobile phone, a smart phone, an electronic personal digital assistant, and/or a mobile and portable dedicated handset, etc. In the example illustrated in FIG. 1, the processed time series of data 5 to be displayed may be provided to the device 70 over the communication network 3.

As will be apparent in greater detail below, in some examples the processed time series of data 5 may comprise:

raw appliance data; and/or

"enhanced appliance data", that is, in the context of the present disclosure, data derived from the raw appliance data and/or from other sources; and/or "derived features", that is, in the context of the present disclosure, features derived from the raw data and which may enable providing a simplified view of the appliance operation, for example as an alternative to the raw and/or enhanced data values. In some examples the derived features may comprise associated parameter values.

An example application of the above types of processed time series of data, as further detailed below, describes an example step of pattern matching against model data, as generally disclosed in the context of the present disclosure.

Typical users of the processed time series of data 5 may include:

service engineers visiting a user of the system 2 to carry out maintenance (such as check-up, repair and/or replacement). In some examples, the processed time series of data may allow providing information which may be more useful to aid in repair or maintenance of the appliance, compared to a fully processed response which may mask useful information or may be incorrect, and/or call centre operatives discussing a problem with a user of the system 2, for example over the phone (such as an inbound call). In some examples, the processed time series of data displayed on the device 70 may provide the call centre operatives with quickly-digestible view on whether the appliance is working normally. In some examples, at the times when the customer thinks the appliance is working normally, the processed time series of data may be used to identify the nature of any possible anomalies and/or whether a customer remedy is possible (e.g. controls settings or appliance reset), whether a maintenance visit is required, or whether no action is required. In some examples, the processed time series of data may be used to verify the effectiveness of the remedy, and/or developers and/or analysts and/or support operatives. In some examples, the processed time series of data may be used to perform ongoing detailed analysis to improve the understanding of the data and/or to improve the functions of the device and/or apparatus in accordance with the disclosure. This may allow increasing the value, to the other users, of the device and/or apparatus in accordance with the disclosure. In some examples, the processed time series of data may be used to support discussion with engineers or call centre staff on specific appliance issues.

In some examples, the device 10 and/or the device 70 comprises an interface.

In some examples, the interface may be configured to display the processed time series of data 5, comprising, in some examples, raw and/or enhanced data and/or derived features, as defined above.

In some examples and as described in further detail below, the interface may provide the processed time series of data (such as the enhanced raw data) in a line graph format with:

parameter values indicated by one axis, and time indicated by another axis.

In some examples and as can be seen, for example, from FIGS. 11 to 16, the line graph may include parameter values which are derived from raw values. This may enable clearer understanding by the user. For example and as described in further detail below, several binary values, such as burner control states, may be combined into one single multi-level value, making the graph much more readable.

In some examples, the range and absolute values used in the derived data values may be chosen to best fill little used values in the overall graph and not to coincide with key values chosen for other enhanced or raw parameters so as to be easily seen by the user. Alternatively or additionally, the values may be chosen to follow intuitive sequences and relationships, for example in a burner control state a low value would indicate a quiescent condition with increasing values representing increasingly active states.

In some examples, the interface may enable the user to view the enhanced data and the raw data together, for example labelling a point in the raw data where a specific anomaly is seen, enabling the user to verify the anomaly and its extent. This may give an opportunity for the user to observe related information in the data.

In some examples, the interface may enable extraction of, in the context of the present disclosure, the "derived features" from the raw data. This may enable providing a simplified view of the appliance operation, for example as an alternative to the raw and/or enhanced data values.

In some examples, the derived features may include individual heating, hot water or other cycles or phases, quiescent periods and/or abnormalities, such as unusual appliance behaviour evident in the data, appliance detected errors and communications failures. In some examples, the derived features may comprise associated parameter values which may describe the properties of the feature. In some examples, the parameter values may include the type of feature and may include feature-specific values, such as maximum temperature, average flow rate, heat exchanger differential temperature, etc. Other non-limiting examples of encompassed derived features and/or associated parameter values are listed further down in the present disclosure.

In some examples, the device 10 and/or the device 70 provides the user with views of the appliance operation populated with the above described derived features in a way that may quickly and easily be understood by a wide range of users.

Table 1 below illustrates a non-limiting example of an interface on which the processed time series of data 5 may be displayed.

TABLE 1

| Date/Start Time | End time | Cycle type | Status |
|---|---|---|---|
| Feb. 2, 2014 10:10 | Feb. 2, 2014 10:15 | Heating cycle | Normal |
| Feb. 2, 2014 10:21 | Feb. 2, 2014 10:25 | Hot water cycle | Normal |
| Feb. 2, 2014 10:32 | Feb. 2, 2014 10:35 | Heating cycle | Normal |
| Feb. 2, 2014 10:43 | Feb. 2, 2014 10:50 | Heating cycle | Abnormal temperature |
| Feb. 2, 2014 10:54 | Feb. 2, 2014 10:59 | Heating cycle | Abnormal temperature |
| Feb. 2, 2014 11:05 | Feb. 2, 2014 11:10 | Hot water cycle | Normal |
| Feb. 2, 2014 11:16 | Feb. 2, 2014 11:20 | Heating cycle | Overheat error |
| Feb. 2, 2014 11:27 | Feb. 2, 2014 11:30 | Hot water cycle | Normal |

It is appreciated that the processed time series of data may also be organised and/or displayed in a number of alternative ways compared to the example shown in Table 1, including as non-limiting examples horizontal timeline with more graphical indication of the appliance history and state.

In some examples and as described in further detail below, the interface may be configured to display an appliance operation split up into a series of cycles, each represented by a visual object, that is typically a coloured area on a horizontal or vertical bar representing a period of time. The visual object, by nature of colour or shape, may describe the type or state of that derived feature.

In some examples, the interface may be configured to display the derived features against a time axis with selectable timescales including hours, days, weeks, months or years.

In some examples, the derived features may typically be displayed as coloured bars occupying areas representing the real time duration of the feature. In some examples, the colour of the feature may be chosen to show (for example):
Green=heating operation,
Blue=hot water operation,
Orange=abnormal operation detected,
Red=appliance detected fault received,
Grey=no data,
White=no activity.

It is understood that alternatively or additionally, the derived features may be shown as chosen shapes or images.

In some examples:
the normal status may be further indicated by a specific colour on the interface (such as green), and/or
the faulty but not so critical status (such as the abnormal temperature) may be further indicated by a specific colour on the interface (such as yellow or orange), and/or
the faulty and critical and/or serious status (such as overheat error) may be further indicated by a specific colour on the interface (such as red).

Additionally or alternatively, the interface may further be configured to provide the user with a graphical means to view any derived feature parameters selected. For example it may be of interest to look at average water flow rate and how this varies with time. Averaging flow rate over arbitrary time windows may be meaningless, as there may be many periods of zero flow. As a consequence, this type of data may be advantageously taken within the context of specific appliance cycles. It is understood that the interface may enable providing a view of this type of data in that context. In some examples, the feature parameter data may be displayed as a line graph, and several parameters may be displayed in the same view. In some examples, flow rate, average temperature and average power are displayed in the same view. It is understood that comparative values of multiple parameters may be important and advantageous in many cases.

In some examples, the interface may be configured to enable the user to select different levels of detail, as appropriate, in any of the views provided, such as:
raw data;
enhanced data,
derived features,
associated parameter values, and/or
any combination of the foregoing.

In some examples, the interface is configured to enable, as non-limiting examples, navigation comprising, for example:
'Zoom' to different levels of time resolution (e.g. one year, week, day, hour, etc);
Selection/de-selection of display for individual parameters and derived feature types.

In some examples, the interface may further be configured to allow a user to navigate down to a display of a more detailed processed time series, from any one of the above-identified cycles, e.g., by performing a clicking or a selection operation.

In some examples, the interface is configured to enable easy navigation between different views. In some examples, the interface may enable a user to select a particular derived feature from a view, and then allow them to move to the specific area of raw and/or enhanced data, to examine the detailed data comprising the feature. Additionally or alternatively, the interface may enable a user to navigate through the raw and/or enhanced data, preceding and/or following, the selected feature, and then navigate back to the derived feature view from other points in the raw data. It is understood that in some examples, the navigation may follow a hierarchy, such that the derived features may be used to display the main high level view as a point of entry for the user with the raw and/or enhanced data being a 'lower level' view below the derived features.

Figure 17:
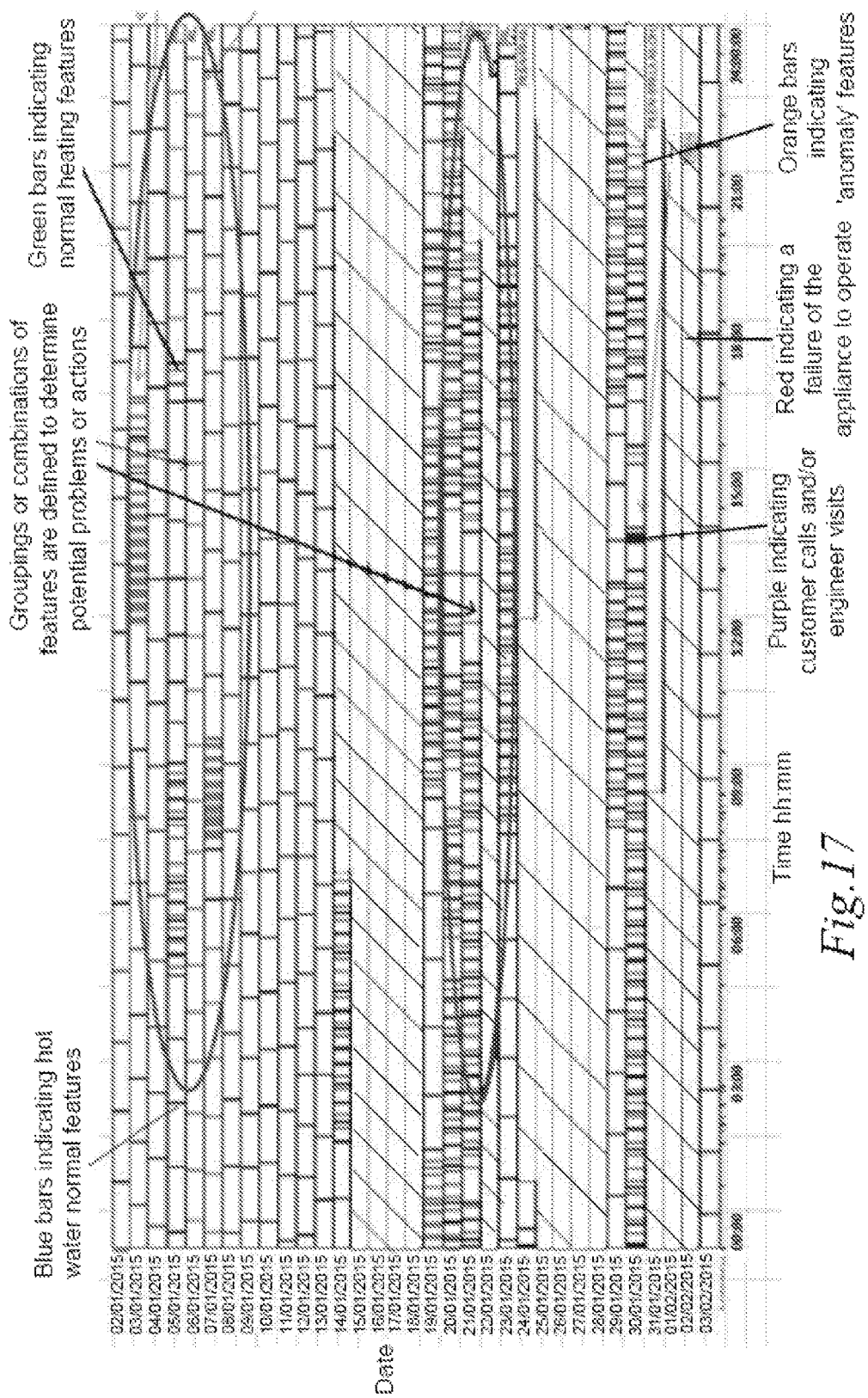
FIG. 17 shows an example of visualisation of the derived features from the raw data, and an example of definition of groupings of the derived features to recognise appliance behaviour of interest.

In some examples and as shown in the example of FIG. 17 described in more detail below, the interface is configured to integrate and display data from other sources within the raw and/or enhanced data and/or the derived feature views. This may further aid the user. In some examples, such additional data may be represented similarly to the derived features or may be shown on a line graph as appropriate for the data type. Some particular non-limiting examples are listed below:

Customer call events relevant to the appliance for which the data is viewed. This may be represented, for example, as a particular coloured bar (e.g. purple) on the derived features view. In some examples, this feature would incorporate associated data (for example including call date and time, described symptoms, outcome, etc.) that would be displayed to the user though selecting an available function of the application;

Engineer visit events would be similarly shown as described above for the customer call. Examples of associated data could be different and could include visit dates, observations, actions performed, parts replaced. This data would also be user viewable on selecting an appropriate function;

Gas or water consumption or other relevant data from the utility meters relevant to the appliance. If available this data could be provided as values in the line graph view and/or as an overall energy, water usage or other parameters for a derived feature;

Heating control system data. If this is available, for example from a smart heating system, then typically the demand cycles may be shown as derived events and the room and/or hot water tank temperature(s) shown in the graphical display.

Alternatively or additionally, the interface may further be configured to, for example, allow a user of the processed time series to have a dialog with a user of the system 2 around, for example, when the appliance was operating normally or not at all. Such a dialog may allow diagnosing simple problems of the system 2 (such as incorrect settings on a heating controller) which could be directly rectified by the user of the system 2 without the operator of the network sending a service engineer on site.

In some examples, as an entry point to the cycle sets on the interface, the user of the processed time series of data could also be provided with an overview summary of the system state. In the example illustrated in Table 2, the interface may display a few simple indicators of the system history, used for example to quickly ascertain whether any problems were detected and their general nature.

TABLE 2

| Cycle type | Count |
| --- | --- |
| Normal heating | 57 |
| Normal hot water | 73 |
| Abnormal temperature | 2 |
| Overheat fault | 1 |

Alternatively or additionally, the interface may display 'rolling up' periods of normal operation into a single visual identifier to highlight the abnormal cycles.

Some examples of representations of data on the interface will now be discussed, in order to illustrate some of the above-mentioned examples.

Figure 11:
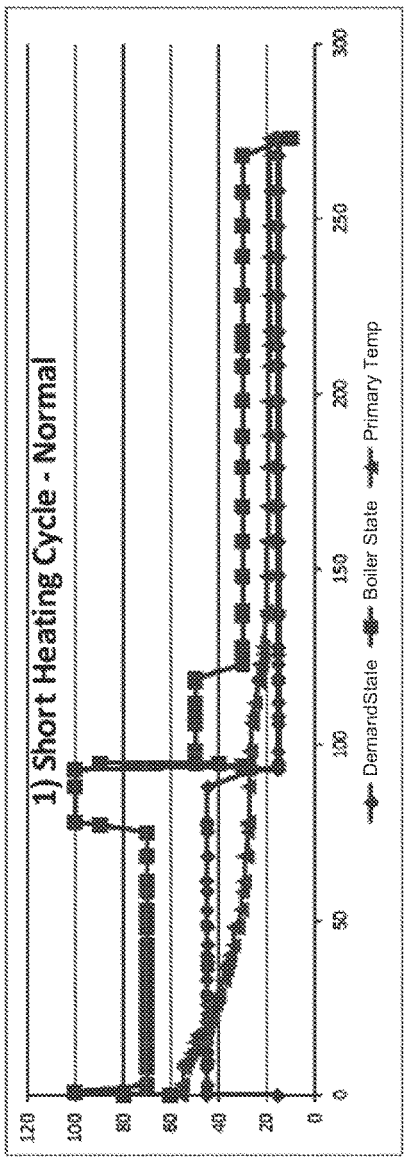
FIG. 11 shows an example of a plurality of time series of data comprising raw data and enhanced data, relating to a normal short heating cycle.

FIG. 11 shows an example of a plurality of time series of data comprising raw data and enhanced data, relating to a normal short heating cycle. FIG. 11 shows some examples of data from a short heating cycle where the behaviour is normal. In the example of FIG. 11, the "primary temperature" is a value directly taken from the boiler showing heat exchanger output. The primary temperature is thus an example of raw data. In the example of FIG. 11, the "demand state" is an example of "enhanced data" and comprises a value derived based on five separate parameters from the appliance translated into a single parameter with discrete values to indicate the following:

No demand;
Heating signal received from controls;
Appliance responding to heat demand;
Appliance in hot water mode;
Intermediate state;

In the example of FIG. 11, 'boiler state' is another parameter derived from a further five parameters, indicating 10 different states of the boiler control from quiescent through ignition to full operation and back.

In the example of FIG. 11, in the normal operation, "demand state" is at value 45, chosen to indicate heating demand, and then goes to 15 for quiescent operation. In the example of FIG. 11, in the normal operation, the "boiler state" value is indicating successful ignition with flame lit, and then, at the end of the demand, a burner purge followed by a short continued period of flow operation.

It will be understood that the use of three parameters "primary temperature", "demand state" and "boiler state" to show the behaviour of the appliance greatly simplifies the display on the interface, compared to the 11 parameters that are used to generate the displayed series.

Figure 12:
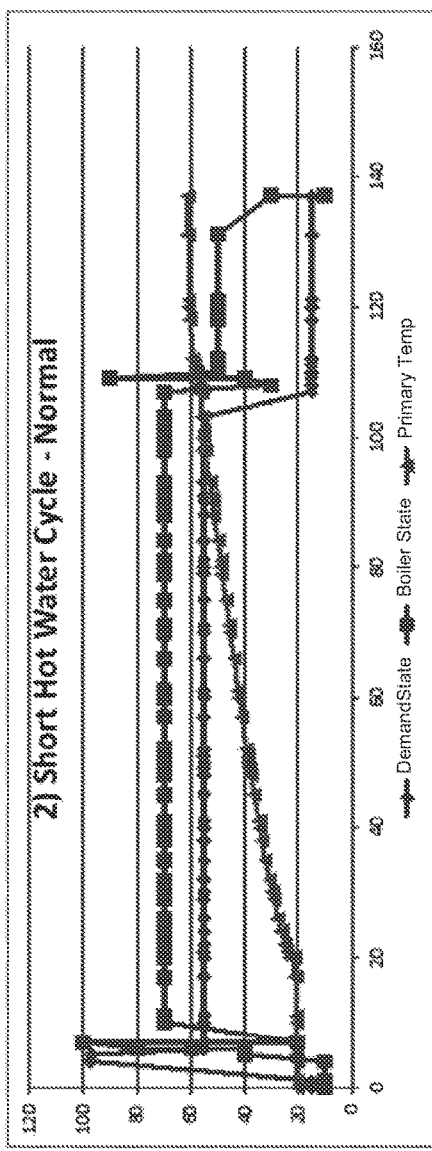
FIG. 12 shows an example of a plurality of time series of data comprising raw data and enhanced data, relating to a hot water cycle.

FIG. 12 shows the same data as FIG. 11, but with a hot water cycle. The "boiler state" parameter follows the same sequence but the different level (level with value 55) indicates hot water demand, and the intermediate level (level value 95) shown at the start indicates transition of water flow component to hot water mode. An extended intermediate state may indicate a problem.

Figure 13:
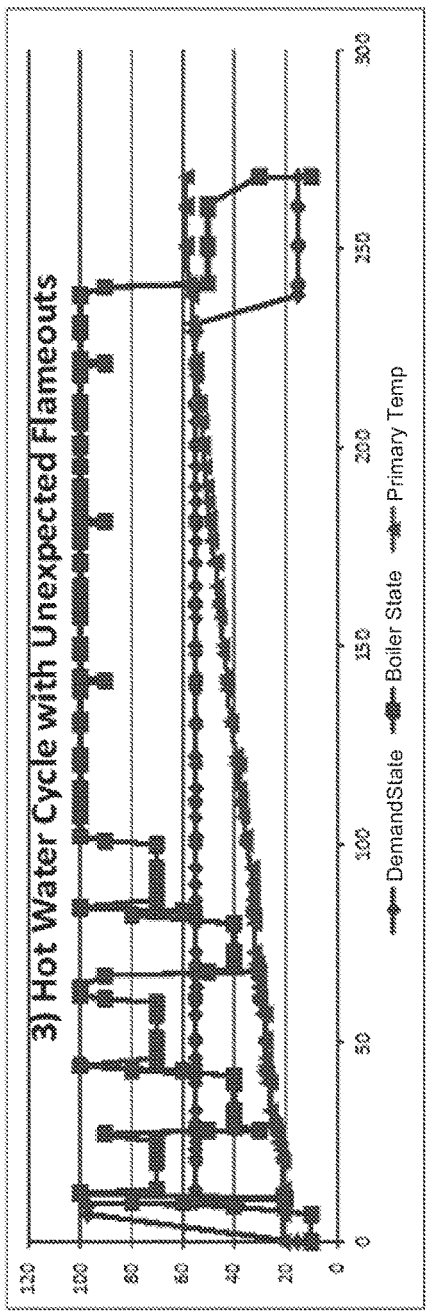
FIG. 13 shows an example of a plurality of time series of data comprising raw data and enhanced data, relating to a hot water cycle which experiences combustion problems.

FIG. 13 shows a hot water cycle (different from that of FIG. 12) which experiences combustion problems at the start, though the cycle does stabilise after a while. FIG. 13 thus shows an example of a cycle which would not result in anything noticeable to the user. The behaviour of the boiler state value makes it immediately evident that there is unusual activity during this cycle which may be worth investigation. In the example of FIG. 13, the use of this visualisation on the interface to first notice the unusual activity has enabled understanding of the characteristics of this flame failure behaviour, and so a 'derived feature' has been identified and a pattern has been defined to enable detection of the feature.

Figure 14:
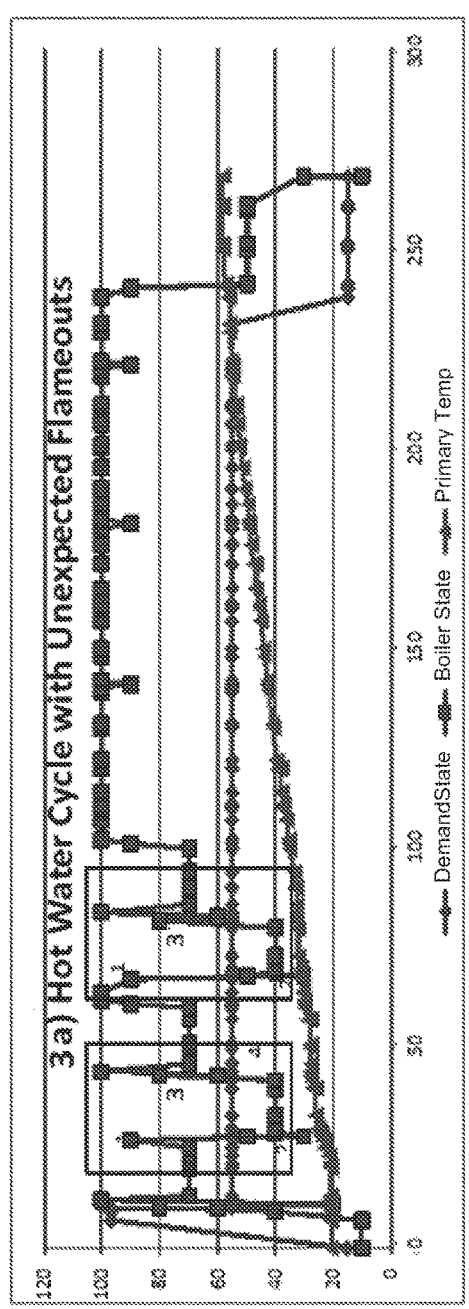
FIG. 14 shows an example of a pattern identified in FIG. 13, with two boxes enclosing numbered points which define a derived feature.

FIG. 14 shows an example of the identified pattern, with the two boxes enclosing the numbered points which define the derived feature as follows:

1—Flame off detected while heating demand active;
2—Fan on detected within TimePeriodG1 of previous event 1;
3—Sparking detected within TimePeriodG2 of previous event 2; and
4—No change in demand by TimePeriodG3 of previous event 3.

Figure 15:
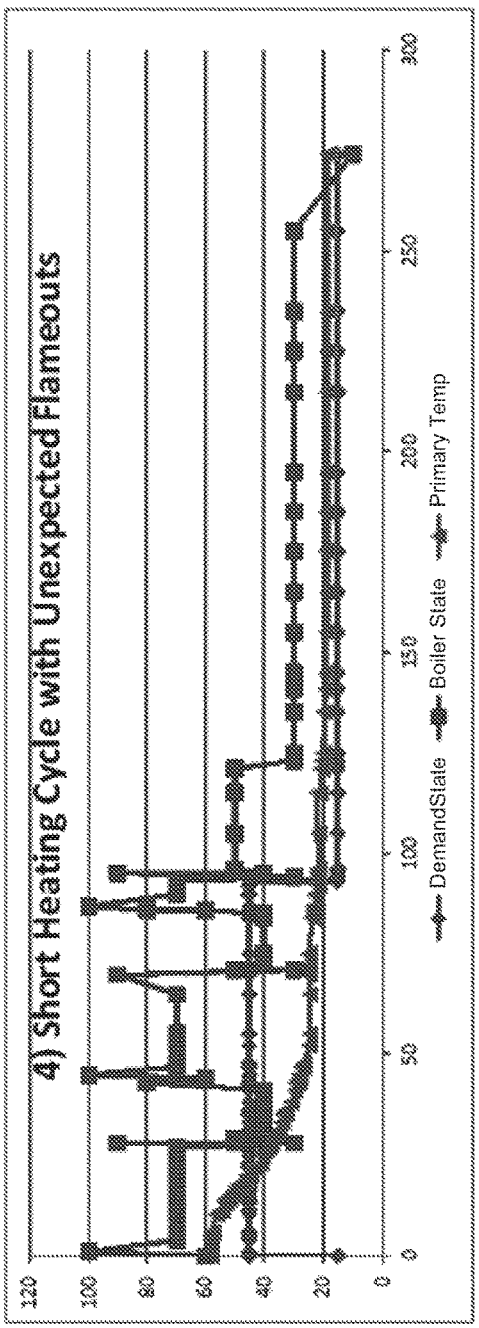
FIG. 15 shows an example of a plurality of time series of data comprising raw data and enhanced data, relating to a heating cycle which also includes two detectable flame failures.

The example of FIG. 15 shows a further heating cycle which also includes two detectable flame failures using the previous 'derived feature' and the identified pattern of FIG. 14. The example cycle of FIG. 15 does not stabilise, but is still not an apparent problem to the user.

Figure 16:
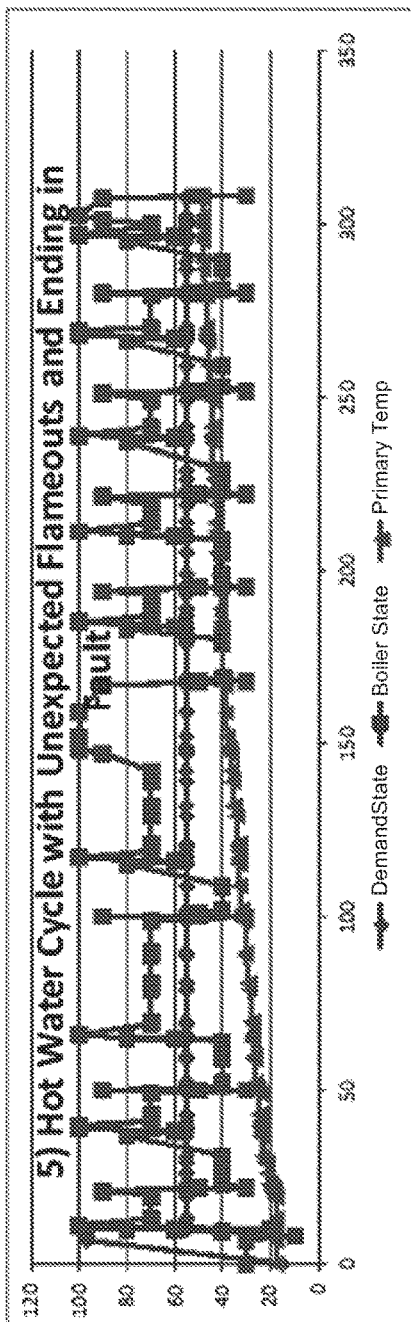
FIG. 16 shows an example of a plurality of time series of data comprising raw data and enhanced data, relating to a hot water cycle with eight detectable flame failures and which finally results in the appliance stopping operation.

The example of FIG. 16 shows a further hot water cycle with eight detectable flame failures that finally results in the appliance stopping operation.

FIG. 17 shows an example of visualisation of the derived features from the raw data and an example of the definition of groups of features that indicate appliance behaviour of interest. In the example of FIG. 17, bars may indicate hot water normal features (such as Blue bars);
groupings or combinations of features may be defined to determine potential problems or actions;
bars may indicating normal heating features (such as Green bars);
bars may indicating 'anomaly' features (such as Orange bars);
zones may indicate a failure of the appliance to operate (such as Red zones); and
zones may indicate customer calls and/or engineer visits (such as Purple zones).

As described in further detail below, the triggering of the maintenance may comprise outputting a maintenance instruction and/or actually maintaining the heating system 2.

Figure 2:
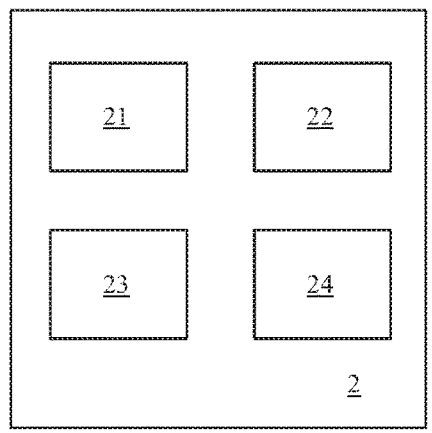
FIG. 2 schematically illustrates an example appliance comprising one or more components.

As illustrated in FIG. 2, the device 10 may be configured to define the appliance such as the heating system 2 in terms of a set of components, each having one or more modes of operation. For example the device 10 may define the heating system 2 as comprising one or more components referred to as 21, 22, 23 and/or 24, corresponding to e.g., at least one inlet 21 (such as fluid inlets 21), and/or
at least one outlet 24 (such as fluid outlets 24); and/or
at least one controller 22 (such as a switch on/off controller 22); and/or
at least one controller 23 (such as an output power controller 23).

The device 10 may thus be configured to receive the one or more time series of data 5 from one or more of the components 21, 22, 23 and/or 24. This enables in-depth analysis of the operation of the heating system or of the cause for a fault. For example, the data 5 may include a set of time-stamped data:

internal data, such as data coming from sensors internal to the system 2, from control state knowledge and/or from operational counters; and/or external data, such as data coming from retrofit sensors and/or from controls information.

The fluid heating system 2 may comprise a controller 25 configured to receive data from sensors and/or from components 21, 22, 23, or 24 of the domestic fluid heating system 2; and send data 5 to the monitoring device 10, e.g., over the network 3. The controller 25 may be a built-in component of the system 2 or may be an add-on controller which can be retrofitted on existing systems 2, thus providing data processing and communications functionality to the system 2.

The device 10 may be configured to parse the data 5 from the system 2 and/or the one or more components 21, 22, 23 and/or 24 once the data 5 is received, and allot the data to corresponding patterns, as explained in greater detail below.

The device 10 may further be configured to assemble one or more models of time series of data 50 from a plurality of data 5 received from the one or more systems 2, for example during a phase of setting up of the device 10. In other words, the device 10 may further be configured to assemble the one or more models of time series of data based on time series of data 5 relating to the operation of the plurality of domestic fluid heating systems 2, received from the plurality of domestic fluid heating systems 2.

Additionally or alternatively, the device 10 may be configured to accept one or more predefined models of time series of data 50, based on programming of the processor 11 of the device 10 by the operator of the network of systems 2 and/or administrator of the device 10 and/or the systems 2. In other words, the device 10 (for example the memory 12) and/or a database 6 may further be configured to store a predetermined model of time series of data. In either case, the one or more models of time series of data 50 corresponds to patterns of modes of operation (including normal and/or faulty operation) of the system 2 and/or of the one or more components 21, 22, 23 and/or 24. The patterns are determined, e.g., via tests, theory, and/or experience from data sets in different conditions. The different conditions may comprise a normal heating condition, a heating operation of the heating system with a blocked condensate drain and/or a heating operation of the heating system with a blocked flue intake. It is appreciated that the plurality of domestic fluid heating systems may comprise different types of domestic fluid heating systems. The model of time series of data may thus correspond to a type of domestic fluid heating systems 2. The device 10 may thus be further configured to identify the type of the domestic fluid heating system 2 in the plurality of domestic fluid heating systems 2, based on the received time series of data 5 and/or on identification received from the domestic fluid heating system 2.

The one or more models of time series of data 50 may be determined for each type of system 2 of interest, for example for different types of boilers 2 connected to the device 10 via the network 3. It is appreciated that the models of time series of data 50 may comprise at least a model for each of at least a normal heating operation, a heating operation with a blocked condensate drain, and a heating operation with a blocked flue intake.

As already mentioned, once determined, the one or more models of time series of data 50 are stored in a database 6. As illustrated in FIG. 1, in an example the database 6 may be at least partly located in the device 10. Alternatively or additionally, as shown in FIG. 1, the database 6 is at least partly external to the device 10 and is connected to the network 3, and the device 10 may be configured to access the database 6 over the network 3. The device 10 may be configured to retrieve the one or more models of time series of data 50 from the database 6 when determining the state of operation of the heating system.

In order to determine the state of operation of the heating system 2, the device 10 may further be configured to compare the received time series of data 5 with one or more models of time series of data 50. The device 10 may be configured to compare the received time series with the models of time series by matching a pattern of the received time series of data 5 (as shown in the key to FIG. 7) to a pattern of a model of time series of data 50 (as shown by the solid lines in FIG. 7).

As already stated, the device 10 may further be configured to determine a course of action based on the determining, and may thus be configured to trigger maintenance of the heating system 2 based on predicting a need for maintenance. The device 10 may thus be configured to timely output a maintenance instruction and/or to perform the maintenance of the heating system 2. The maintenance instruction may be sent, for example, to at least one controller such as the controller 23, locally on the system 2 and/or over the network 3. The maintenance instruction may also be sent to a user of the system 2, for example, via a SMS and/or an email. Some of the maintenance operation may thus be performed directly by the user of the system (for example deblocking a block condensate drain and/or repressurizing the system where a loss of pressure is detected), thus saving costs for the operator of the network of systems. As explained in greater detail below, the device 10 may further be configured to predict longer term trends of operation of the system 2, and may thus lengthen the period of time between successive servicing operations in the network of systems, thus saving costs for the operator of the network of systems.

As already stated in connection with the Figures, in some examples, as an example of a step of pattern matching disclosed in the context of the present disclosure, the device 10 may be configured to recognise defined combinations of derived features that could indicate problems and/or actions to be carried out. Additionally or alternatively, the device 10 may be configured to indicate the detection of the defined combinations to a user. In some examples, an indication may typically indicate a diagnosis with a description of any actions recommended and/or an indication of any parts to be replaced (if necessary). Additionally or alternatively, the device 10 may be configured to indicate a non-breakdown service operation and/or an adjustment for the customer to make to control settings, etc.

It will be appreciated that the present disclosure encompasses simple cases involving one single derived feature or complex situations with numerous derived features.

It will be also appreciated that a combination of features can be defined, for the combination to be present, in terms of:

type of each feature;
number of each feature type,
minimum or maximum time period, and/or
sequence.

In some examples, a sequence may also include a determination whether the feature is present at the start of a cycle, mid-cycle or cycle end.

In some examples, the combination logic may also exclude specified features which would not be present if the 'recognition' output was true. Some non-limiting examples of combined features may include:

Primary Over temperature+Hot water demand+Hot water under temperature=Inspect pump and replace if faulty;

If greater than 3 instances of the following are detected within 3 months, then adjust minimum combustion rate:

Partial Ignition failure detected OR (Fault Code=Failed ignition no flame detected) AT demand start AND (demand type=CH).

In some examples, the device 10 may be configured to continuously update in 'real time' any views incorporating raw data and/or enhanced data and/or derived features and/or responses to grouped features, that is, for example, as soon as any new data is received. This may enable spotting quickly any changes in behaviour, if being viewed by user (such as engineer or call centre staff). This may be valuable in enabling a user (such as engineer or call centre staff) to check, for example, the effect of a remedy applied, new problem arising, successful reset or heating control setting change.

In reference to FIGS. 1 and 2:

the fluid inlets 21 of the boiler 2 may comprise the inlet 205, the inlet port 210, the fan 209, and/or the inlet 211; and/or the fluid outlets 24 of the boiler 2 may comprise the outlet 206, the condensate drain 218, and/or the exhaust outlet 207; and/or the switch on/off controller 22 may comprise the unit 213 and/or the flame failure device 217; and/or the output power controller 23 may comprise the unit 215.

Figure 7:
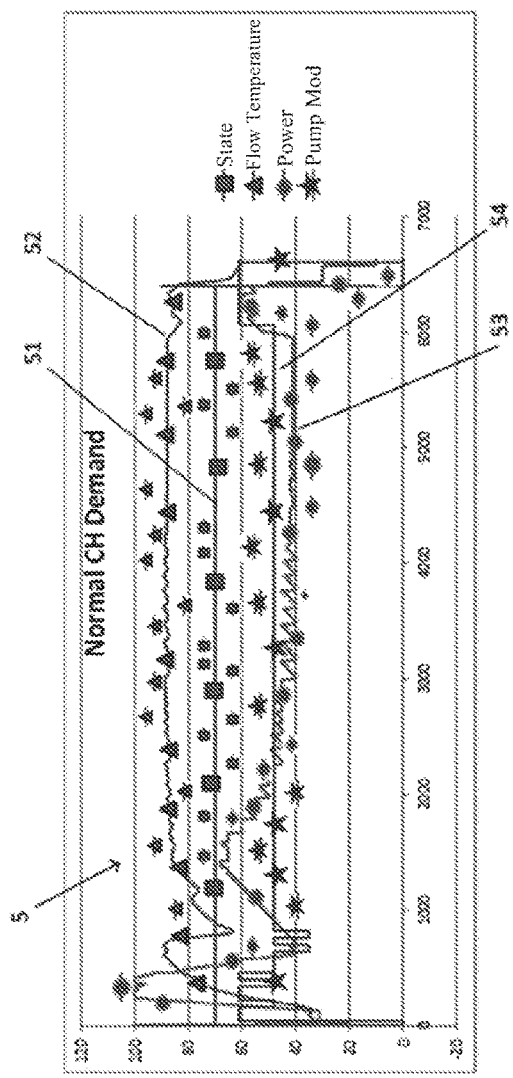
FIG. 7 shows an example of a plurality of time series of data relating to the operation of a heating system over a cycle of operation.

FIG. 7 schematically illustrates that the time series of data 5 may be at least one time series of data 5, i.e. the data 5 may comprise one or more time series of data 5, referred to, e.g. as 51, 52, 53, or 54 in FIG. 7.

As illustrated in FIG. 7:

time series 51 may refer to the heating mode of the heating system 2, for example the on/off state of a flame of a burner of the heating system 2;

time series 52 may refer to the temperature of the flow at the output of the heating system 2, for example the temperature of water at an outlet after a heat exchanger of the heating system 2 (sometimes referred to as primary flow);

time series 53 may refer to an output power of the heating system 2; and/or time series 54 may refer to the mode of an inlet pump of the heating system 2.

It is thus appreciated that each of the time series 51, 52, 53, or 54 may be the output of a different component of the system 2, for example, in reference to FIGS. 2 and 3:

time series 51 may be the output of the switch on/off controller 22, and in some examples the output from the unit 213 and/or the flame failure device 217; and/or time series 52 may be the output of the fluid outlet 24, and in some examples the output from the outlet 206; and/or time series 53 may be the output of the output power controller 23, and in some examples the output from the unit 215; and/or time series 54 may be the output of a fluid inlet 21 of the system 2, and in some examples the output from the fan 209.

The device 10 illustrated in FIG. 1 and the method 100 illustrated in FIG. 4 may both take advantage of the fact that:

there exists a model for a normal heating operation of the system 2, and that there are usually common ways of failure of a heating system which can be recorded over at least one cycle of operation.

It is thus appreciated that the state of operation of the heating system 2 (including normal operation or faulty operation of the heating system 2) may thus be determined, at S20, based on comparing:

time series of data 5 relating to the operation of the heating system 2 over a cycle 4 of operation, with a model of time series of data 50 corresponding to the operation of the heating system 2 (including normal operation or faulty operation of the heating system 2) over a cycle 4 of operation.

Figure 8:
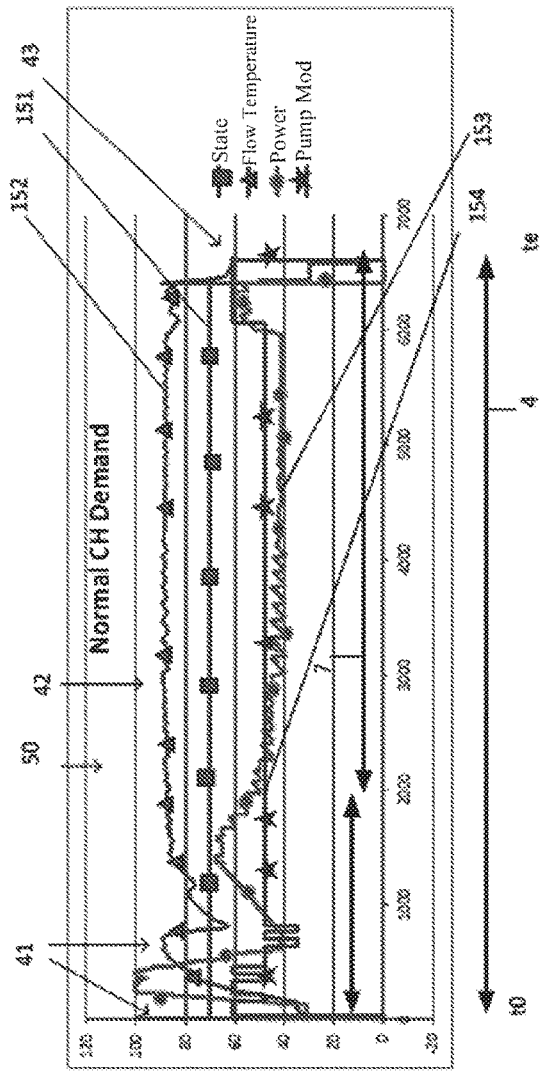
FIG. 8 shows an example of a plurality of model time series of data relating to the normal operation of a heating system over a cycle of operation.
Figures 9, 10:
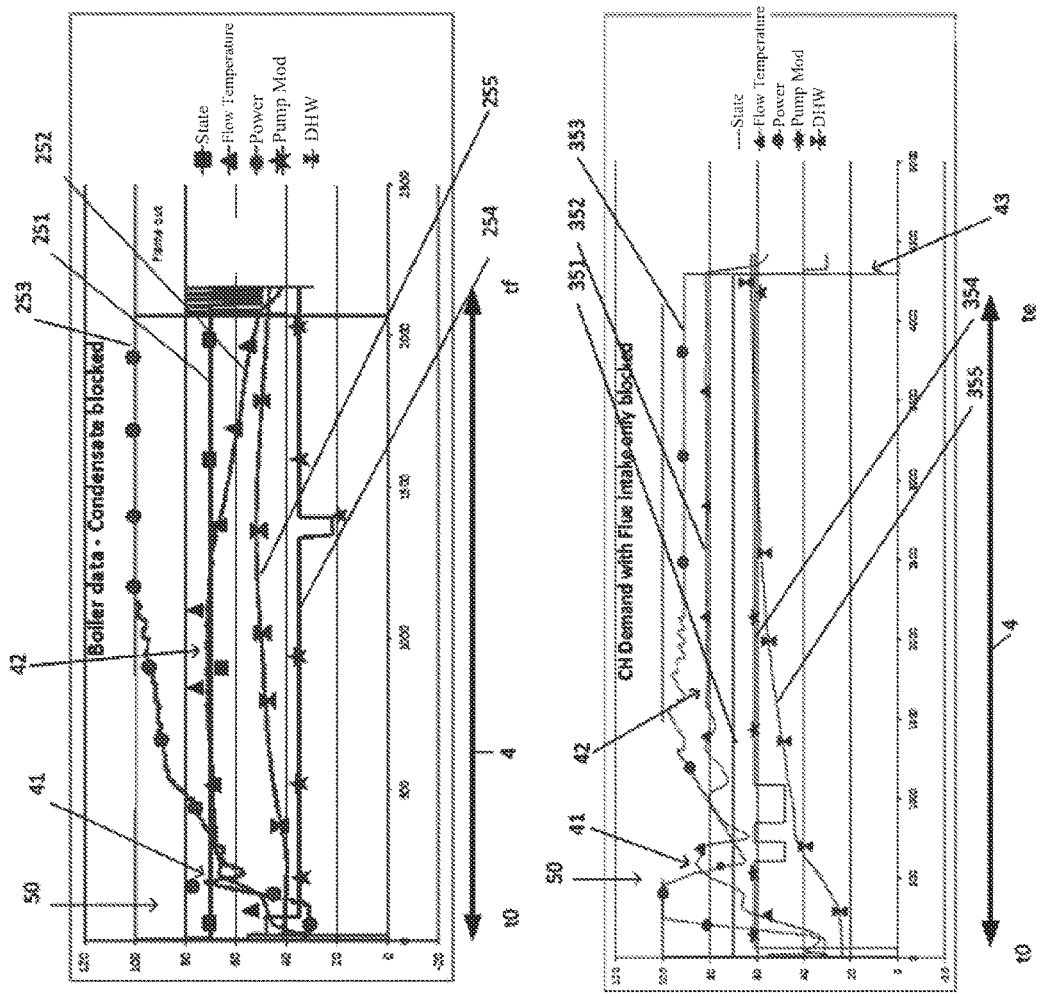
FIG. 9 shows an example of a plurality of model time series of data relating to the heating operation of the heating system with a blocked condensate drain, over a cycle of operation.
FIG. 10 shows an example of a plurality of model time series of data relating to a heating operation of the heating system with a blocked flue intake, over a cycle of operation.

FIGS. 8 to 10 schematically illustrate that the model time series of data 50 may be at least one model time series of data 50, i.e. the data 50 may comprise one or more models of time series of data 50, referred to, e.g. as models 151, 152, 153 or 154 illustrated in FIG. 8, corresponding to models for a normal heating operation of the heating system 2, as models 251, 252, 253, 254 or 255 illustrated in FIG. 9, e.g., corresponding to models for a heating operation of the heating system 2 with a blocked condensate drain, and as models 351, 352, 353, 354 or 355 illustrated in FIG. 10, e.g., corresponding to models for a heating operation of the heating system 2 with a blocked flue intake.

As illustrated in FIG. 8, for a normal heating operation of the heating system 2:

model time series 151 may refer to the heating mode of the heating system 2;

model time series 152 may refer to the temperature of the flow at the output of the heating system 2;

time series 153 may refer to an output power of the heating system 2; and/or time series 154 may refer to the mode of an inlet pump of the heating system 2.

The one or more models for normal heating operation will now be explained with reference to FIG. 8. A heating demand by a user activates, at time t0, an operation cycle corresponding to a heating operation cycle 4 of the heating system 2. As shown by model 151, after a short period 41 of transient mode of operation, the heating mode of the heating system moves rapidly to a period 42 of steady mode of operation, corresponding to the flame of a burner being active (shown by value 70). As shown by model 153, the output power of the heating system 2 shows a period 41 of transient mode of operation, including gradual increase, to bring the temperature of the flow at the output of the heating system 2 to the appropriate temperature, and then drops (after about 1500 seconds) to a period 42 of steady mode of operation, around 40%. As shown by model 152, after about 2000 seconds, the temperature of the output flow shows a period 42 of steady mode of operation, where it is held at around 88° C. Heating demand is removed by a user at to (around 6500 seconds) and the system 2 returns to quiescent state after a short period 43 of transient mode of operation.

As illustrated in FIG. 9, for a heating operation of the heating system 2 with a blocked condensate drain:

model time series 251 may refer to the heating mode of the heating system 2;

model time series 252 may refer to the temperature of the flow at the output of the heating system 2 (primary flow);

model time series 253 may refer to an output power of the heating system 2;

model time series 254 may refer to the mode of an inlet pump of the heating system 2; and/or model time series 255 may refer to the temperature of the flow of domestic hot water (DHW) (secondary flow).

The one or more models for a heating operation with a blocked condensate drain will now be explained with reference to FIG. 9. Heating demand is applied by a user at t0 and, as shown by model 252, after a period 41 of transient mode of operation (around 300 seconds) the output temperature reaches a period 42 of steady mode of operation, around 70° C. The condensate drain is blocked, and the combustion chamber of the heating system 2 gradually fills with water, thus reducing the actual heat output of the system 2. Therefore, as shown by model 253, the power of the system 2 gradually ramps up to a maximum (e.g., 100), after which, as shown by model 252, output temperature starts (around 1300 seconds) to drop below target (i.e. 70° C.). As shown by model 251, eventually flame extinguishes at tf through oxygen starvation, and the system 2 attempts at about 2200 seconds re-ignition of the flame.

As illustrated in FIG. 10, for a heating operation of the heating system 2 with a blocked flue intake:

model time series 351 may refer to the heating mode of the heating system 2;

model time series 352 may refer to the temperature of the flow at the output of the heating system 2 (primary flow);

model time series 353 may refer to an output power of the heating system 2;

model time series 354 may refer to the mode of an inlet pump of the heating system 2; and/or model time series 355 may refer to the temperature of the flow of domestic hot water (DHW) (secondary flow).

The one or more models for a heating operation of the heating system 2 with a blocked flue intake will now be explained with reference to FIG. 10. Heating demand is applied by a user at t0, and, as shown by model 352, after a period 41 of transient mode of operation (around 1500 seconds) the output temperature reaches a period 42 of steady mode of operation, around 88° C. The flue inlet is blocked so, as shown by model 354, the heating system 2 drives an inlet pump (such as a fan) harder to draw sufficient oxygen in for the required output power. As shown by model 353, the power required in this instance is 80%, i.e. over twice the normal level shown by 153 in FIG. 8 (i.e. 40% for normal heating operation). Heating demand is removed by a user at to (around 6500 seconds) and the system 2 returns to quiescent state after a short period 43 of transient mode of operation. During the cycle 4, the heating system 2 works normally as seen by a user, but is at risk of ignition failing and will likely emit excess carbon monoxide, which is dangerous for the user. A fault should be diagnosed, and a need for maintenance predicted as described in greater detail below.

An exemplary method according to the disclosure will now be described with reference to FIGS. 4 to 6.

As illustrated in FIG. 4, the method 100 comprises the device 10 receiving, at S10, at least one time series 51, 52, 53, 54 of data 5 relating to the operation of the heating system 2 over a cycle of operation. The definition of the cycle is described in greater detail below.

At S20, the device 10 determines the state of operation of the heating system 2 based on comparing the received time series 51, 52, 53 or 54 with at least one corresponding model of time series of data 50 (referred to as 151, 152, 153, 154; 251, 252, 253, 254, 255; 351, 352, 353, 354, or 355 as shown in FIGS. 8 to 10, as already discussed).

S20 will now be described in more detail in reference to FIG. 5.

At S201, the device 10 defines the cycle of operation. The cycle of operation may comprise:

a period 41 and/or 43 of transient mode of operation, and a period 42 of steady mode of operation.

The cycle of operation may correspond to the cycle 4 of operation of the heating system 2. For example the cycle 4 of operation of the heating system 2 is derived from a duration taken from a time series corresponding to the heating mode of the heating system 2, such as time series 51 and/or 151. For example the duration may be taken from a period taken from a 'power on' signal to a 'power off' signal, such as a period taken from an 'ignition/flame on' signal or instruction to an 'ignition/flame off' signal or instruction. The cycle 4 of operation of the heating system 2 may thus be easily defined.

In order to clearly define a cycle of operation for some of the time series, an auxiliary cycle 7 of operation corresponding to, e.g.:

a cycle of operation for the components 21, 22, 23 or 24, and/or an operating phase of the system 2.

In some examples, the auxiliary cycle 7 may be derived from a duration taken from a first time series, such as time series 51 or 151 as explained above, and from a portion of a second time series based on the first time series. For example, the first 30% of the cycle 4 of operation of the system 2 may not be significant e.g., for the times series 53. Therefore an auxiliary cycle 7 (starting for example at 30% of the cycle 4, i.e. starting from 2000 seconds as shown in FIG. 8) may be defined for the time series 53, in order for the times series 53 to be compared with times series 153, 253, or 353 more significantly.

As already stated above, in some examples, in order to determine the auxiliary cycle 7, the time series of data 5 may be parsed into a set of time periods 8 which contain data relating to different operating phases of the system 2, such as:

quiescent phase, ignition phase (i.e. a sequence of actions to light the burner), space heating phase, water heating phase, and/or post combustion (i.e. clearing the combustion chamber 202 and cooling the system 2).

In some examples, the operating phases may be identified using the pattern matching approach previously described to correlate time series of data with 'models' of the various possible states. Alternatively or additionally, the operating phases may be identified using specific parameters in the data 5, such as e.g. a space heating status value and/or a flame detection value. In some examples, the space heating status value may indicate start of ignition phase. In some examples, the flame detection value may indicate when ignition phase is complete.

The diagnosing may thus comprise using a timing of departure of the time series of data 5 from a model of time series of data 50 corresponding to a normal operation of the heating system 2 over a cycle 4 or 7 of operation.

At S202, the device 10 compares, respectively:

times series 51 with times model times series 151, 251 and/or 351; and/or times series 52 with times model times series 152, 252 and/or 352; and/or times series 53 with times model times series 153, 253 and/or 353; and/or times series 54 with times model times series 154, 254 and/or 354.

As shown in FIG. 7, the comparing performed at S202 comprises matching a pattern of the received time series 51, 52, 53 or 54 to a pattern of a model of the time series of data cited above.

If no matching is found at S202, then the cycle may not be properly defined at S201, and the process returns to S201.

If a match is found by the device 10 at S202, it is determined at S203 if the matching of at least one of 51, 52, 53 or 54 relates to normal operation time series 151, 152, 153, or 154.

If no matching with normal operation is found at S203, then the process is directed to S207 where the corresponding fault is diagnosed, i.e. for example a heating operation with a blocked condensate drain, or a heating operation of the heating system 2 with a blocked flue intake.

The process is directed to S208 where it is determined if the diagnosing of a faulty operation at S207 triggers diagnosing, at S209, more precisely a fault, for example a fault of a component 21, 22, 23, or 24 of the heating system 2.

If the device 10 is configured to trigger a further diagnosing at S209, diagnosing more precisely a fault may comprise for example, at S209, defining a new specific cycle, parsing the data 5 and identifying a pattern of a fault, e.g., of a component 21, 22, 23, or 24, defining a new time series to compare with a new model time series, and comparing. Then the process ends and continues with S30 of FIGS. 4 and 6.

If it is determined at S208 that the device 10 is not configured to trigger a further diagnosing, the process ends and continues with S30 of FIGS. 4 and 6.

If a matching with normal operation is found at S203, then the process is directed to S204 where normal operation is diagnosed.

At S205, it is determined if the device 10 is configured to determine the state of the system 2 over more than one cycle 4.

If it is determined at S205 that the device 10 is not configured to determine the state of the system 2 over more than one cycle 4, the process ends and continues with S30 of FIGS. 4 and 6.

If it is determined at S205 that the device 10 is configured to determine the state of the system 2 over more than one cycle 4, the process is directed to S206 where potential trends are determined. Identifying a trend at S206 may comprise using comparisons between cycles 4 (the cycles are not necessarily successive cycles, and any number of cycles may be considered). The process ends and continues with S30 of FIGS. 4 and 6.

As already stated, the method 100 also comprises determining, at S30, a course of action based on the determining of S20.

S30 will now be described in more detail in reference to FIG. 6.

At S301, the device 10 determines if a faulty operation was determined at S20.

If it is determined at S301 that a faulty operation was determined at S20, the device 10 determines at S302 if maintenance is needed and/or should be predicted, i.e. in case e.g., the fault is dangerous for the user and/or critical for the functioning of the heating system 2. S302 allows avoiding unnecessary and costly maintenance for minor faults of the system 2.

If no maintenance is needed, then the process ends.

If it is determined at S302 that a need for maintenance is predicted, then the device 10 triggers at S303 maintenance, in a timely fashion. The process then ends.

It is appreciated that centralization in the device of the data relating to the operation of a plurality of systems enables more efficient management of the plurality of systems, both economically and technically, and allows avoiding rushing costly maintenance if the maintenance can be delayed and performed in a more efficient way (e.g. for a cluster of heating systems 2 connected to the same network 3). The maintenance may thus be planned and rationalized, for both technical and economic efficiencies. The data from the plurality of systems 2 may also be used for analysis and statistics.

It is appreciated that centralization of the data relating to the operation of the plurality of systems and/or appliances may enable, in some examples, comparison methods between multiple systems and/or appliances, for example enabling understanding the ranges of behaviours which could be encountered. In some examples, the comparison methods may include (for selected groups of appliances and/or systems):

Probability distribution of selected feature types using colour intensity or other means, for example to visually indicate frequency of occurrence. This could typically show demand profile density across a population and most frequent times of day week or year for selected anomalies to occur; and/or Min, max, mean and probability distribution for selected derived feature parameters. For example this could show the range and typical values for hot water flow rate across a population.

As already stated, the triggering may comprise outputting a maintenance instruction and/or actually maintaining the heating system, for example locally or by sending technicians to the system 2. The maintenance instruction may be sent, for example, to at least one controller such as the controller 23, locally on the system 2 and/or over the network 3. The maintenance instruction may also be sent to a user of the system, for example, via a SMS, by giving instructions to the user.

If it is determined at S301 that a faulty operation was not determined at S20, it is determined at S304 if a faulty trend was determined at S20, then the process is directed to S302 already described.

Aspects and preferred examples of the present invention are set out in the appended claims.

In another aspect, there is provided a computer program product comprising program instructions to program a processor to carry out data processing of methods according to aspects of the disclosure or to program a processor to provide controllers, devices and apparatus (comprising the device, the network and the plurality of appliances) according to aspects of the disclosure.

As one possibility, there is provided a computer program, computer program product, or computer readable medium, comprising computer program instructions to cause a programmable computer to carry out any one or more of the methods described herein. In some examples, components of the device 10 and/or the communications network 3 may use specialized applications and hardware. It is appreciated that software components of the present disclosure may, if desired, be implemented in ROM (read only memory) form. The software components may, generally, be implemented in hardware, if desired, using conventional techniques.

In example implementations, at least some portions of the activities related to the device 10 and/or the communications network 3 herein may be implemented in software.

Various features described above may have advantages with or without other features described above.

A method and/or a device and/or an apparatus and/or a computer program product according to aspects of the disclosure may enable a better understanding of complex data. A method and/or a device and/or an apparatus and/or a computer program product according to aspects of the disclosure may enable, for example:

addressing some of the limitations found in using affordable sensors and/or types of data; and/or taking into account different types of influences on the data, including influences due to a system external to the appliance, communications, firmware deficiencies and/or customer behaviour; and/or enhancing knowledge of a behaviour seen in appliance data when there is a failure; and/or assisting in identifying a specific cause of failure using raw appliance data; and/or assisting in determining what data indicates an event which requires a repair visit or which does not require immediate (or any) response, preferably from a single instance of a detected anomaly; and/or assisting in determining context dependant response to a data anomaly, e.g. determining that an apparent fault detected during heating system or other maintenance is a result of a maintenance operation and needs no response; and/or presenting existing service records of repairs carried out and parts changed in the context of the appliance operation.

A method and/or a device and/or an apparatus and/or a computer program product according to aspects of the disclosure may enable using data available, in an enhanced way compared with known methods monitoring remotely the operation of one or more heating systems, such as boilers, in response to fault codes, or crossing of a threshold of a given parameter, or to a rate of change of different parameters.

A device and/or an apparatus and/or a computer program product according to aspects of the disclosure may be configured to allow continuous improvement and maintenance of functionalities, particularly to take into account newly understood data interpretations and new appliances or data sources becoming available. In some examples, this may enable:

defining new enhanced parameters in terms of selecting grouping, scaling and display characteristics for the new enhanced parameter;

defining new derived features in terms of feature type, display characteristics, recognition patterns and derived feature parameters; and/or defining new derived feature recognition groupings, time windows and sequences and recommendation text.

A device and/or an apparatus and/or a computer program product according to aspects of the disclosure may also be configured to validate and build a controlled set of reference data which can then in turn be used to train and develop automated means of anomaly detection, for example using machine learning to relate data patterns to specific outcomes. Machine learning or similar methods will be much less effective if arbitrary data sets assembled against parts replaced (for example) are used for training the machine learning system as this data will generally include a significant proportion of invalid data and results.

Below are given some non-limiting examples of 'derived features' referenced to above, plus one or more exemplary corresponding detection methods. It is understood that the list below is not intended as an exhaustive list of features and/or algorithms which are universal to all appliances, but rather intended to give an illustration of the derived features and how they are used in the context of the disclosure:

Features derived directly from raw appliance data:
Heating demand start/end, Instantaneous hot water demand start/end, appliance fault detected/cleared;

Preheat demand:
Start detected if appliance indicates hot water demand state but hot water flow is zero for greater than TimePeriodA
End detected after above when demand state indicates quiescent;

Frost demand:
Boiler heating activity detected in absence of demand signals and heating or hot water temperature sensors indicate temperature below TemperatureB;

Unknown demand:
Boiler is running in absence of any evident demand signals;

No demand:
No boiler operation detected, no anomalies evident, data being received correctly;

No data:
If no data received for TimePeriodC
Important in diagnosis of communications and connectivity issues as well as if appliance electrical power lost;

Hot water flow sensed by temperature:
If rate of change of Hot Water temperature is TemperatureRiseRateD in TimePeriodD, and
If Hot Water temperature is <TemperatureD at end of TimePeriodD and remains below for TimePeriodB then indicate failed hot water demand;

Heating Overtemperature1:
If boiler output temperature is >temperatureE for TimePeriodE then Overtemperature1 error detected
(Note that there could also be overtemperature2 and further features using a different threshold and time);

Partial Ignition Failure:
Most appliances will make several attempts to ignite the flame with a complete failure being indicated by a fault code. An algorithm that detects the data pattern relating to failed attempts that do not result in total failure may be used to identify these occurrences for diagnostics relating to combustion issues
    If sparking detected start timer until next sparking attempt
    During TimePeriodF if (flame detected OR fan off OR Heating Demand off OR Hot Water Demand off) then terminate timer, no ignition fail detected
    If sparking detected again before end of TimePeriodF then Ignition fail is detected;

Unexpected flameout:
If a flame lights but is then extinguished, then the appliance will generally attempt to relight the flame and if successful this will go unnoticed. Detecting when this has happened may provide useful diagnostics for combustion issues
    If flame off detected while heating demand active OR hot water demand active then start timer
    If not fan on within TimePeriodG1 then detection terminated
    If not sparking detected within TimePeriodG2 then detection terminated
    If no change in demand by TimePeriodG3 then: unexpected flameout detected else detection terminated;

Abnormal Preheat demand:
  (Can indicate diverter valve problems)
  If preheat rate of rise <RateOfRiseH OR Preheat demand duration >TimeperiodH then excess preheat detected;
Abnormal heating cycle:
  If boiler output temperature has not risen above TemperatureK in TimePeriodK after start of heating cycle then abnormal heating cycle detected;
Abnormal heating cycle end:
  (Can also indicate diverter valve problems)
  If boiler output temperature has not fallen by TemperatureL in TimePeriodL after end of heating cycle then abnormal heating cycle end detected;
Abnormal Hot Water Cycle:
  (heat exchanger, pump and pressure problems)
  If hot water demand detected and hot water flow rate >0 then monitor hot water output temperature
  If hot water temperature does not exceed TemperatureM in TimePeriodM then abnormal hot water cycle detected;
Further anomalies may include:
  Excessively high or low rate of rise or fall in heating temperature
  Abnormal modulation behaviour
  Abnormal flame current behaviour
  Abnormal heat exchanger differential temperature behaviour The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

As will be apparent to the skilled in the art, the server should not be understood as a single entity, but rather refers to a physical device comprising at least a processor and a memory, the memory being comprised in one or more servers which can be located in a single location or can be remote from each other to form a distributed network (such as "server farms", e.g., using wired or wireless technology).

In some examples, one or more memory elements (e.g., the data base 6 and/or the memory 12) can store data used for the operations described herein. This includes the memory element being able to store software, logic, code, or processor instructions that are executed to carry out the activities described in the disclosure.

A processor can execute any type of instructions associated with the data to achieve the operations detailed herein in the disclosure. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

The data received by the device 10 is typically received over a range of possible communications networks 3 at least such as: a satellite based communications network; a cable based communications network; a telephony based communications network; a mobile-telephony based communications network; an Internet Protocol (IP) communications network; and/or a computer based communications network.

In some examples, the communications network 3 and/or the device 10 may comprise one or more networks. Networks may be provisioned in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network.

The invention claimed is:

1. A method for determining a state of operation of a domestic fluid heating system in a plurality of domestic fluid heating systems, comprising:
  receiving, at a device from a controller of the domestic fluid heating system, a time series of data relating to the operation of the domestic fluid heating system over a cycle of operation, wherein
  the domestic fluid heating system comprises one or more sensors,
  the one or more sensors are selected from the group consisting of control state sensor, temperature sensor and power sensor, and
  the device is configured to receive data from at least one of the one or more sensors of the domestic fluid heating system; and
  determining, at the device, the state of operation of the domestic fluid heating system based on comparing the received time series with a model of time series of data corresponding to the operation of the plurality of domestic fluid heating systems over a cycle of operation, wherein
  the data comprising a plurality of parameters,
  for each parameter of the data, the determining of the state of operation is not performed instantaneously but performed after at least one or more cycles of operation of the domestic fluid heating system, and
  the cycle of operation comprises at least one of a period of transient mode of operation and a period of steady mode of operation.

2. The method according to claim 1, wherein the comparing comprises matching a pattern of the received time series of data to a pattern of a model of time series of data.

3. The method according to claim 1, wherein the comparing comprises retrieving the model of time series of data from a database.

4. The method according to claim 1, wherein the plurality of domestic fluid heating systems is connected to a network, and wherein the receiving of the time series comprises receiving the data over the network.

5. The method according to claim 1, further comprising assembling the model of time series of data based on time series of data relating to the operation of the plurality of domestic fluid heating systems, received from the plurality of domestic fluid heating systems.

6. The method according to claim 1, wherein the determining of the state of operation of the domestic fluid heating system comprises diagnosing a fault of the domestic fluid heating system based on the comparing,
further comprising triggering diagnosing a fault of a component of the domestic fluid heating system based on the diagnosing of the fault of the domestic fluid heating system, and
wherein diagnosing a fault comprises diagnosing at least one of: heating operation of the domestic fluid heating system with a blocked condensate drain and heating operation of the domestic fluid heating system with a blocked flue intake.

7. The method according to claim 1, further comprising:
detecting a trend of operation of the domestic fluid heating system, based on the determining of the state of operation of the domestic fluid heating system over at least two cycles of operation;
predicting a need for maintenance based on the detecting of the trend; and
triggering maintenance of the domestic fluid heating system based on the predicting;
wherein triggering maintenance comprises outputting a maintenance instruction.

8. The method according to claim 1, comprising defining a cycle of operation based on at least one of:
deriving from a duration taken from a first time series and from a portion of a second time series selected based on the first time series;
using specific parameters in the plurality of parameters of the data,
wherein the duration taken from the first time series is:
a period taken from a power on signal to a power off signal, and
the specific parameters in the data comprise at least one of: a space heating status value and a flame detection value; and
defining an auxiliary cycle of operation corresponding to at least one of:
a cycle of operation for one or more components of the domestic fluid heating system, and
an operating phase of the domestic fluid heating system,
wherein the auxiliary cycle of operation is derived from at least one of a duration and a parsing, wherein
the duration is taken from at least one of a first time series and a portion of a second time series based on the first time series; and
the parsing comprises parsing the time series of data into a set of time periods which contain data relating to different operating phases of the system selected from the group consisting of quiescent phase, ignition phase, space heating phase, water heating phase and post combustion.

9. The method according to claim 1, performed at least partly locally in the heating system.

10. The method according to claim 1, wherein the domestic fluid heating system is a domestic boiler.

11. The method according to claim 1, wherein the time series of data comprises at least one of:
raw appliance data; and
enhanced data derived from the raw appliance data; and
at least a derived feature.

12. The method according to claim 11, wherein the derived feature comprises at least a feature derived from the raw appliance data.

13. The method according to claim 1, further comprising providing the time series of data in a line graph format.

14. The method according to claim 13, further comprising at least one of formatting the time series of data and averaging the time series of data, to display the data over a relevant cycle of operation of the fluid heating system.

15. The method according to claim 1, comprising integrating input from external sources.

16. The method according to claim 1, comprising at least one of validating reference data and building reference data, to train or develop an anomaly detector.

17. The method according to claim 1, comprising at least one of:
defining additional, new, derived features and any associated parameters, and
configuring additional, new, derived features and any associated parameters.

18. The method according to claim 1, wherein the comparing comprises comparison between processed data from multiple fluid heating systems in order to characterise common behaviours and differences.

19. A device configured to determine a state of operation of a domestic fluid heating system in a plurality of domestic fluid heating systems, configured to:
receive, from a controller of the domestic fluid heating system, a time series of data relating to the operation of the domestic fluid heating system over a cycle of operation, wherein
the domestic fluid heating system comprises one or more sensors,
the one or more sensors are selected from the group consisting of control state sensor, temperature sensor and power sensor, and
the device is configured to receive data from at least one of the one or more sensors of the domestic fluid heating system; and
determine the state of operation of the domestic fluid heating system based on comparing the received time series with a model of time series of data corresponding to the operation of the plurality of domestic fluid heating systems over a cycle of operation, wherein
the data comprising a plurality of parameters,
for each parameter of the data, the determining of the state of operation is not performed instantaneously but performed after at least one or more cycles of operation of the domestic fluid heating system, and
the cycle of operation comprises at least one of a period of transient mode of operation and a period of steady mode of operation.

20. A non-transitory computer program product comprising program instructions to carry out a method for determining a state of operation of a domestic fluid heating system in a plurality of domestic fluid heating systems, comprising:
receiving, at a device from a controller of the domestic fluid heating system, a time series of data relating to the operation of the domestic fluid heating system over a cycle of operation, wherein
the domestic fluid heating system comprises one or more sensors,
the one or more sensors are selected from the group consisting of control state sensor, temperature sensor and power sensor, and
the device is configured to receive data from at least one of the one or more sensors of the domestic fluid heating system; and
determining, at the device, the state of operation of the domestic fluid heating system based on comparing the received time series with a model of time series of data corresponding to the operation of the plurality of domestic fluid heating systems over a cycle of operation, wherein the data comprising a plurality of parameters, for each parameter of the data, the determining of the state of operation is not performed instantaneously but performed after at least one or more cycles of operation of the domestic fluid heating system, and the cycle of operation comprises at least one of a period of transient mode of operation and a period of steady mode of operation.

\* \* \* \* \*